No. 738,451. PATENTED SEPT. 8, 1903.
M. R. JACKSON.
HORSESHOE CALK.
APPLICATION FILED DEC. 26, 1902.
NO MODEL.

Witnesses
M. R. Jackson, Inventor
by
Attorneys

No. 738,451.

Patented September 8, 1903.

UNITED STATES PATENT OFFICE.

MALERY R. JACKSON, OF TIPTON, IOWA.

HORSESHOE-CALK.

SPECIFICATION forming part of Letters Patent No. 738,451, dated September 8, 1903.

Application filed December 26, 1902. Serial No. 136,676. (No model.)

*To all whom it may concern:*

Be it known that I, MALERY R. JACKSON, a citizen of the United States, residing at Tipton, in the county of Cedar and State of Iowa, have invented a new and useful Horseshoe-Calk, of which the following is a specification.

This invention relates to horseshoes of the class having yieldable calks, and has for its object the production of a simply constructed and applied device whereby the concussion arising from the impact of the horse's shoes with the pavement will be absorbed and prevented from being imparted to the limbs of the horse; and the invention consists in certain novel features of construction as hereinafter shown and described, and specified in the claims.

Figure 1:
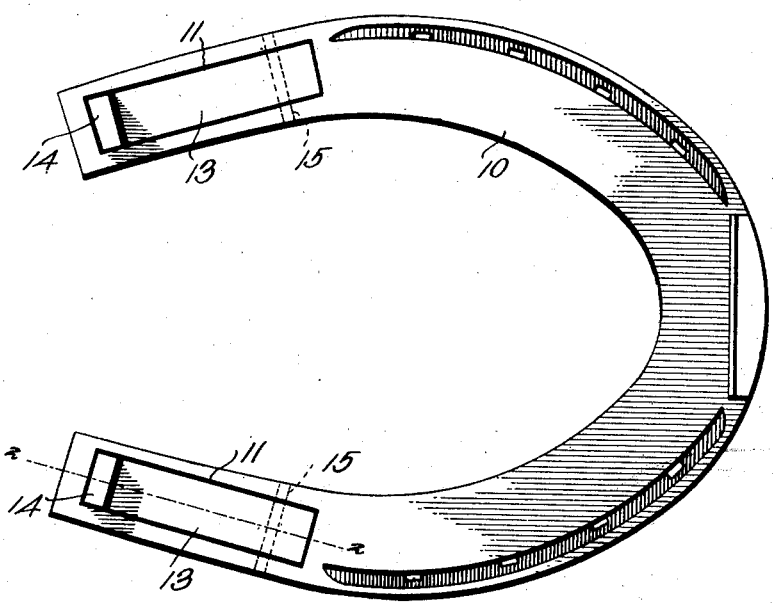
Figures 2, 3:
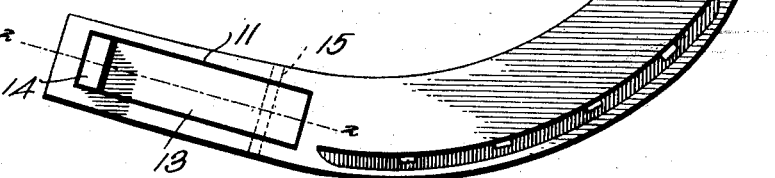

In the drawings illustrative of the invention, in which corresponding parts are denoted by like designating characters, Figure 1 is a bottom plan view of a horseshoe with the improvement embodied therein. Fig. 2 is a sectional detail on the line 2 2 of Fig. 1. Fig. 3 represents a detail perspective view of one of the calk-plates detached.

In applying this improvement the horseshoe (indicated as a whole at 10) is provided with recesses 11 in the under sides of its "heel" portions, with the outer or rear ends of the recesses formed to overhang, as at 12, and as both recesses and their attachments are substantially the same like designating characters are employed to denote corresponding parts in each.

Within the recesses 11 are arranged plates 13, each having one of the heel-calks 14 upon one end and each pivotally connected, as by transverse screws or rivets 15, in the opposite ends of the recesses and free to move by their other ends. Each calk-plate will be provided with a rib 16, adapted to extend, respectively, beneath the lips 12, which form stops to limit the outward movements of said calk-plates, as will be obvious.

Disposed within the recesses 11 between the plates 13 and the body of the shoe are springs 17, exerting their force to yieldably maintain the plates normally in their outward positions, as shown in Fig. 2. The springs may be formed integral with the plates 13 at one end, as at 18, or formed separately and connected thereto, as preferred, and curved away from the plate intermediately and movably engaging the bottom of the recesses and thence returned into movable engagement with the plates by their outer ends, as shown in Fig. 2. By this means the calk-plates will be firmly supported in position in the recesses and at the same time be sufficiently yieldable to absorb the concussion between shoes and the pavement and prevent it from being imparted to the feet or legs of the horse. The springs will be of sufficient strength to support the weight of the horse and resist collapse thereby, but which will yield to the concussion caused by the impact with the pavement when the horse is moving rapidly, whereby the concussion is absorbed by the springs, as above noted.

The calk-plates may be manufactured very cheaply, as by drop-forging, and bent to shape entirely by machinery and can be furnished to the trade at small cost. They will preferably be of steel and may be tempered, as required, to resist the pressure and strains to which they will be subjected.

To remove the calk-plates, it is only necessary to remove the screws or rivets 15, and when a calk becomes worn or dull the plate can be renewed or the calk sharpened without detaching the shoe from the hoof. Then again summer or winter calks may be very quickly attached interchangeably, as required, without detaching the shoes and by any person of ordinary skill and without the necessity for employing skilled mechanics to do the work. The calk-plate may be of any desired size or weight to adapt them to the shoe to which they are attached. The knee action of a horse equipped with shoes containing this yieldable calk will be greatly improved and promoted, as the springs will force him to raise his feet higher than he naturally would or when wearing shoes without the spring-calks. With shoes equipped with the spring-calks the necessity for heel-weights will be obviated, as the spring-calks will accomplish the same results and without increasing the weight.

Having thus described my invention, what I claim is—

1. As a new article, a horseshoe having recesses in the rear ends, calk-plates pivotally connected by one end in said recesses and having the heel-calks upon their opposite ends, stops for limiting the outward movements of said calk-plates, and springs within said recesses and operating to yieldably support said calk-plates, substantially as described.

2. As a new article, a horseshoe having recesses in the rear ends, calk-plates pivotally connected by one end in said recesses and having the heel-calks upon their opposite ends, and springs integral with said plates at one end and extending into movable engagement with the body of the shoe and likewise into movable engagement with the opposite end of the plate, substantially as described.

3. As a new article, a horseshoe having recesses in the rear ends with overhanging lips at their rear ends, calk-plates pivotally connected by one end in the inner ends of said recesses and with the opposite ends extending beneath said lips, and springs within said recesses and operating to maintain said calk-plates in yieldable engagement with said lips, substantially as described.

4. As a new article, a horseshoe having recesses in the rear ends, calk-plates pivotally connected by one end in said recesses and having the heel-calks upon their opposite ends, and springs connected by one end to said plate and extending into movable engagement with the body of the shoe and likewise into movable engagement with the opposite end of the plate, substantially as described.

In testimony that I claim the foregoing as my own I have hereto affixed my signature in the presence of two witnesses.

MALERY R. JACKSON.

Witnesses:
J. W. WRIGHT,
R. R. LEECH.